(12) United States Patent
Endo et al.

(10) Patent No.: US 11,467,173 B2
(45) Date of Patent: Oct. 11, 2022

(54) SAMPLE CONTAINER LOADING OR STORING UNIT AND SAMPLE TEST AUTOMATION SYSTEM PROVIDED WITH SAME

(71) Applicant: Hitachi High-Technologies Corporation, Tokyo (JP)

(72) Inventors: Masashi Endo, Tokyo (JP); Katsuhiro Kambara, Tokyo (JP); Shigeru Yano, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 472 days.

(21) Appl. No.: 16/627,014

(22) PCT Filed: May 31, 2018

(86) PCT No.: PCT/JP2018/020893
§ 371 (c)(1),
(2) Date: Dec. 27, 2019

(87) PCT Pub. No.: WO2019/003789
PCT Pub. Date: Jan. 3, 2019

(65) Prior Publication Data
US 2020/0225252 A1 Jul. 16, 2020

(30) Foreign Application Priority Data
Jun. 30, 2017 (JP) .............................. JP2017-128214

(51) Int. Cl.
*G01N 35/00* (2006.01)
*G01N 35/02* (2006.01)
*G01N 35/04* (2006.01)

(52) U.S. Cl.
CPC ....... *G01N 35/04* (2013.01); *G01N 35/00732* (2013.01); *G01N 35/026* (2013.01);
(Continued)

(58) Field of Classification Search
CPC ............ G01N 35/04; G01N 35/00732; G01N 35/026; G01N 2035/00801;
(Continued)

(56) References Cited

U.S. PATENT DOCUMENTS

2013/0061693 A1    3/2013    Sasaki et al.
2014/0287515 A1    9/2014    Habrich et al.
(Continued)

FOREIGN PATENT DOCUMENTS

JP      2007-198897 A    8/2007
JP      2012-021911 A1    2/2012
(Continued)

OTHER PUBLICATIONS

International Search Report of PCT/JP2018/020893 dated Jul. 10, 2018.

*Primary Examiner* — Jill A Warden
*Assistant Examiner* — John McGuirk
(74) *Attorney, Agent, or Firm* — Mattingly & Malur, PC

(57) ABSTRACT

The sample container loading or storing unit includes a sample rack tray and a sample rack tray installation portion on which the sample rack tray is installed, the sample rack tray installation portion includes a claw portion that moves in a contact direction with a sidewall portion of the sample rack tray, the sample rack tray includes a claw guard portion provided on the sidewall portion of the sample rack tray, and the claw guard portion is configured to be separated from the sidewall portion of the sample rack tray by being pushed by a sample rack.

6 Claims, 9 Drawing Sheets

(52) U.S. Cl.
CPC .............. *G01N 2035/00801* (2013.01); *G01N 2035/0418* (2013.01)

(58) Field of Classification Search
CPC ... G01N 2035/0418; G01N 2035/0494; G01N 35/02; B01L 2200/14; B01L 9/06
See application file for complete search history.

(56) References Cited

U.S. PATENT DOCUMENTS

| | | | |
|---|---|---|---|
| 2015/0268259 A1* | 9/2015 | Gomm ................. | G01N 35/025 422/63 |
| 2016/0202279 A1 | 7/2016 | Endo et al. | |
| 2020/0319222 A1* | 10/2020 | VanSickler ......... | B01L 3/50855 |

FOREIGN PATENT DOCUMENTS

| WO | 2011/148897 A1 | 12/2011 |
|---|---|---|
| WO | 2014/042011 A1 | 3/2014 |

\* cited by examiner

[FIG. 1]
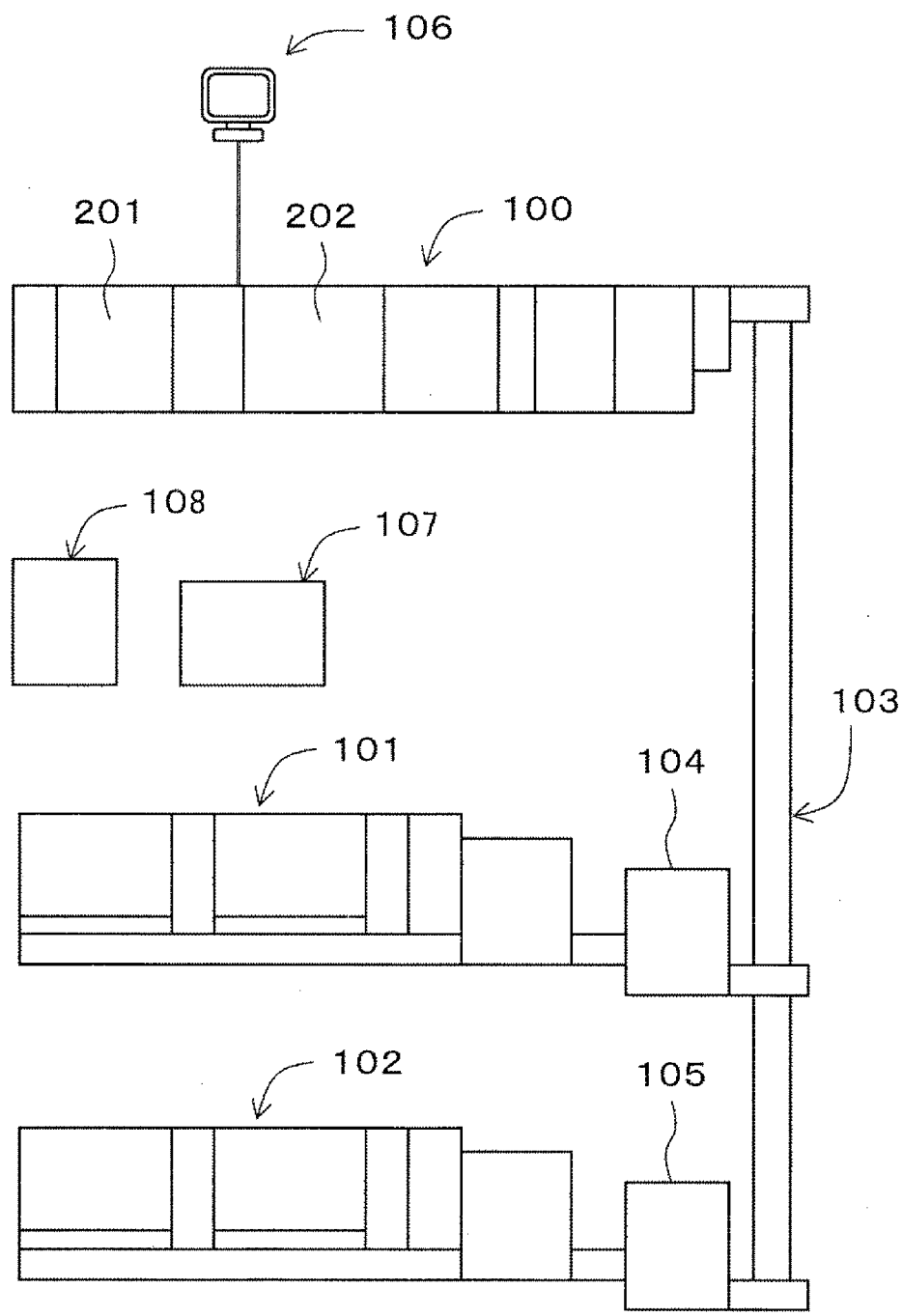

[FIG. 2]
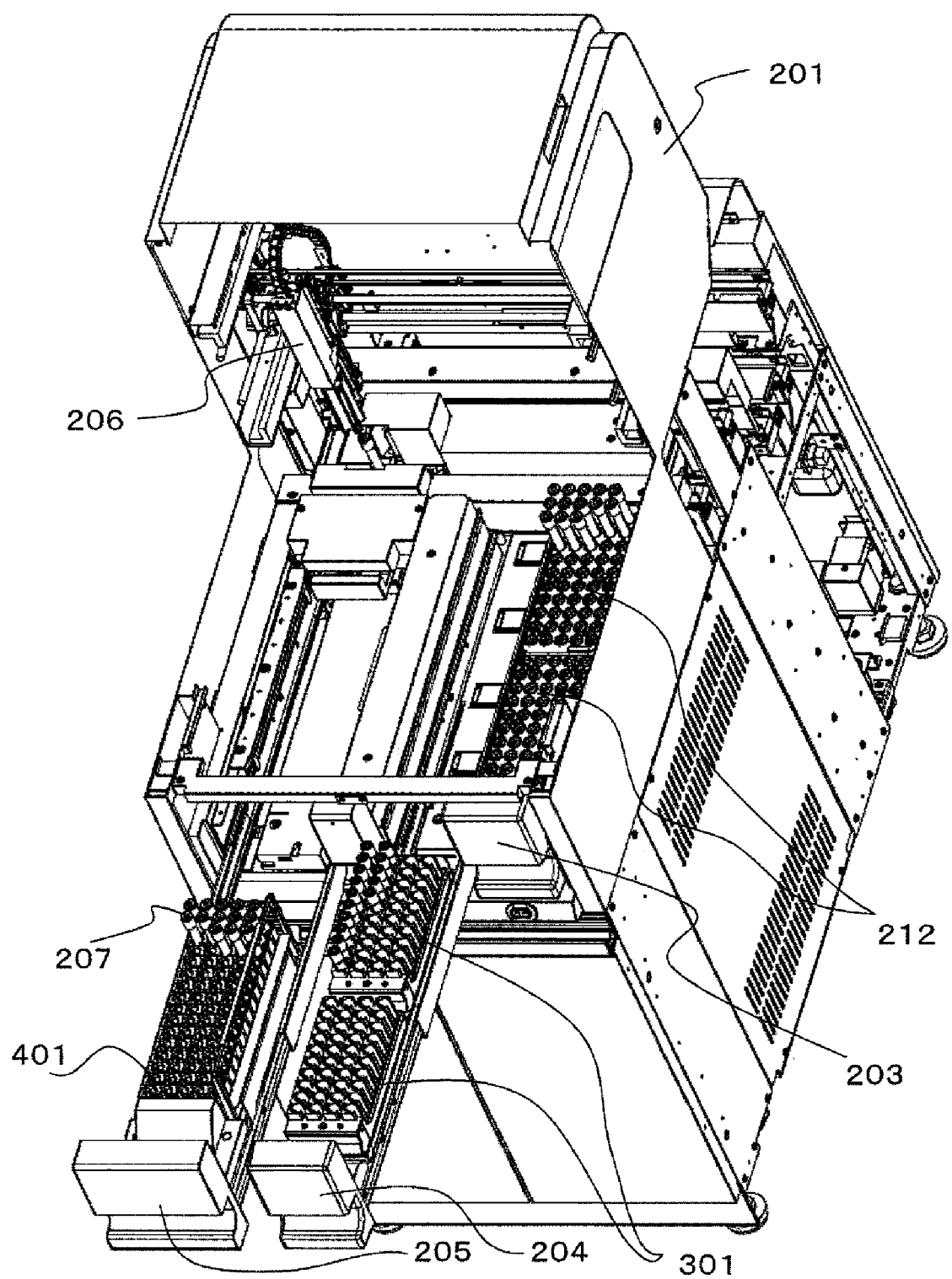

[FIG. 3]
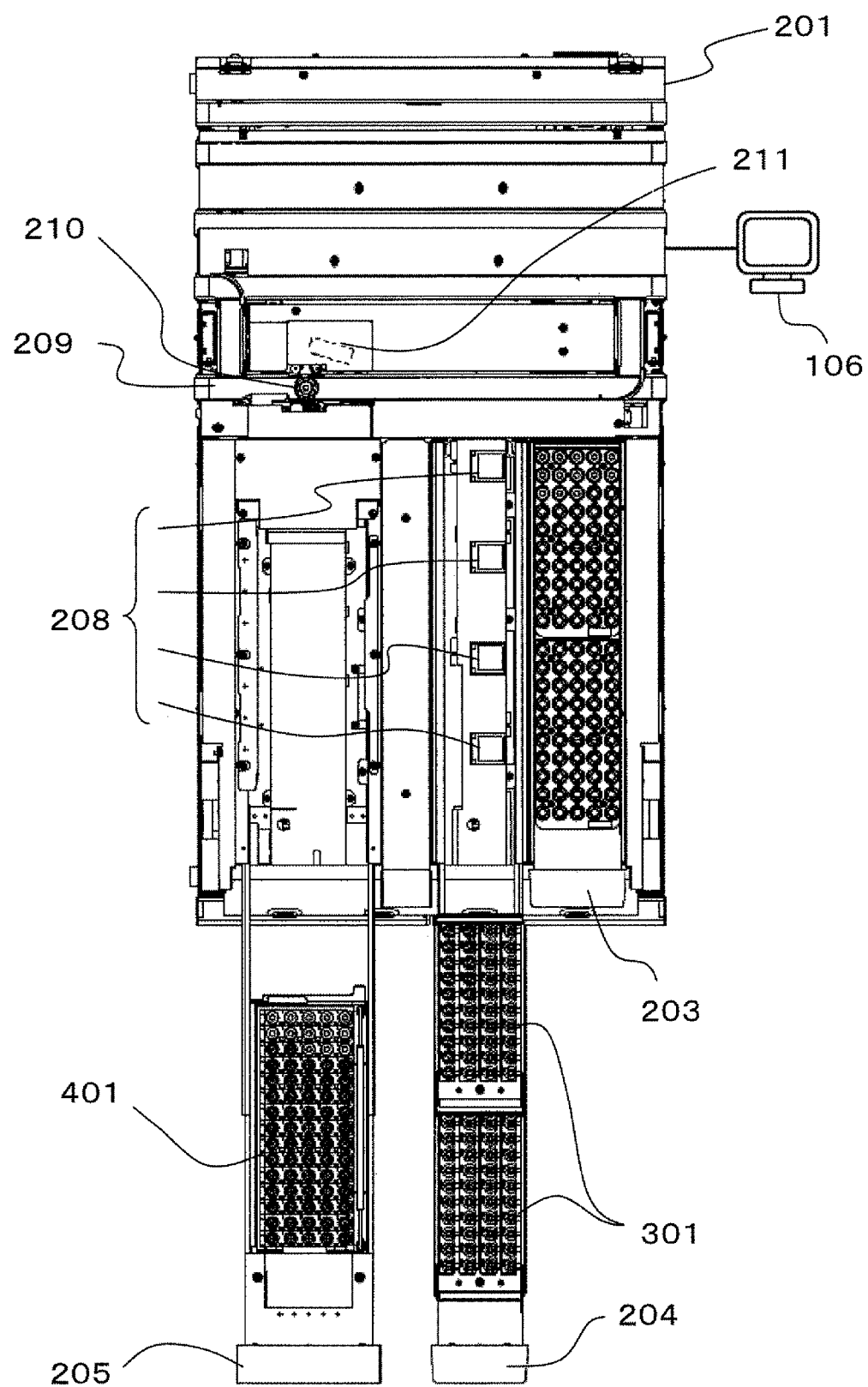

[FIG. 4]
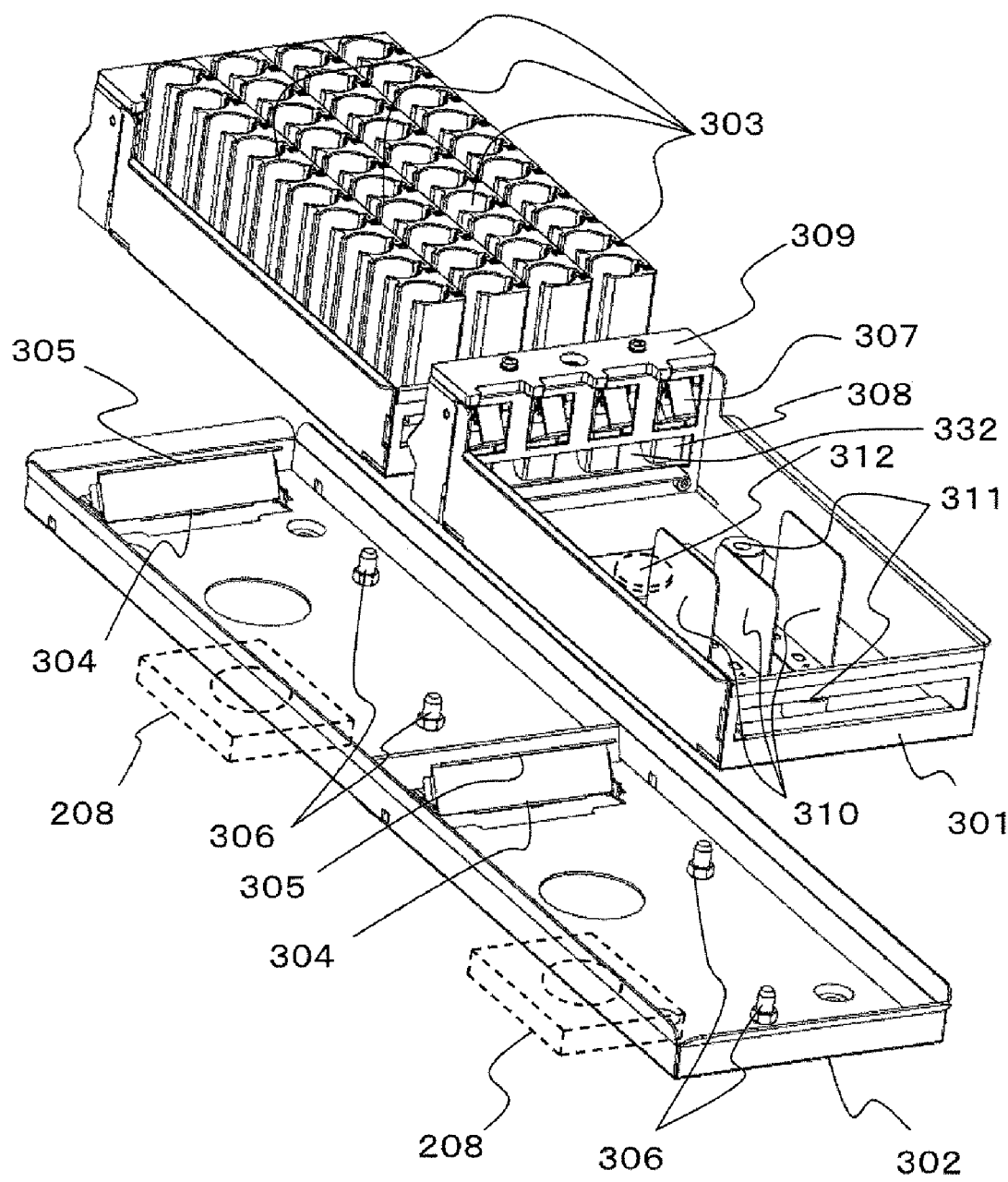

[FIG. 5]
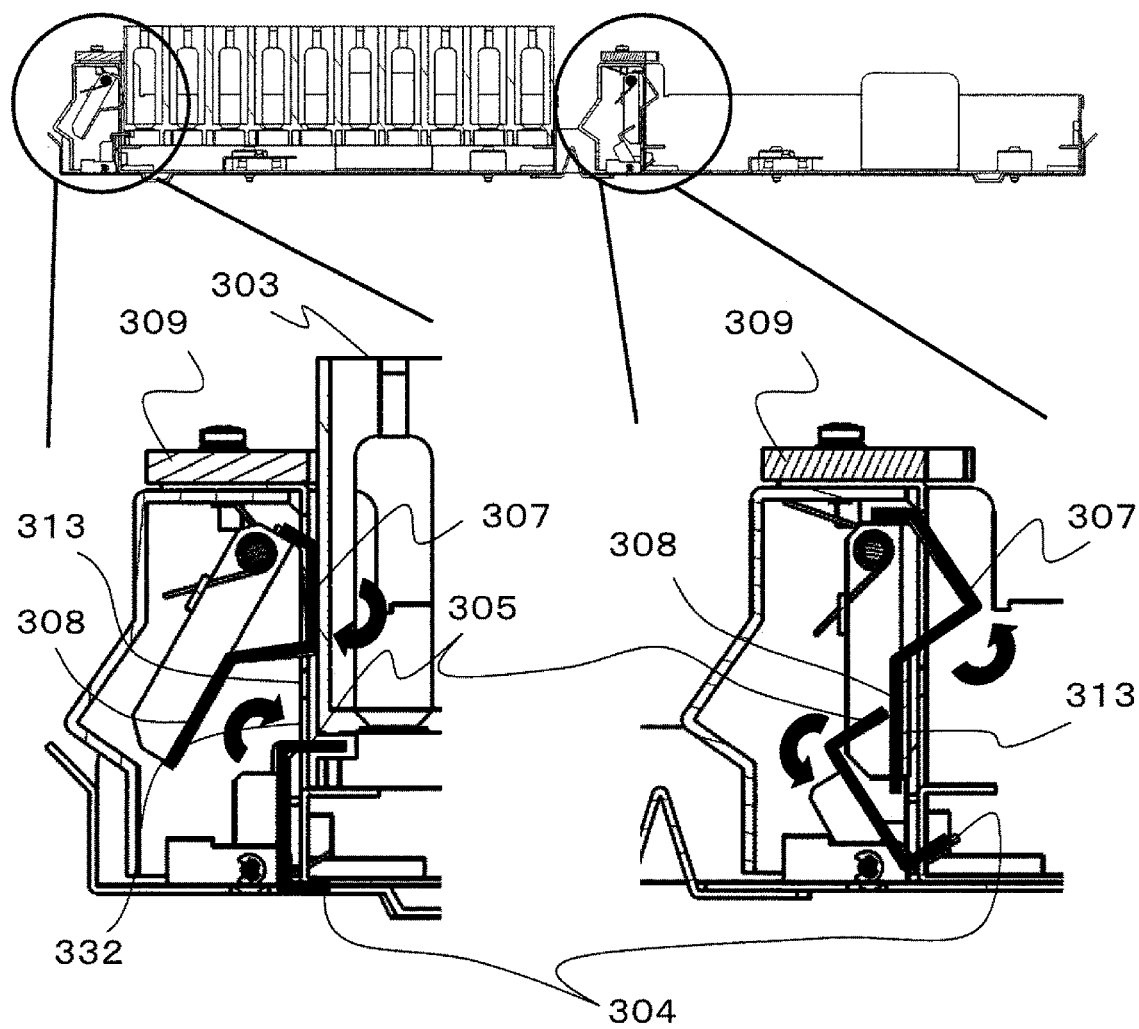

[FIG. 6]
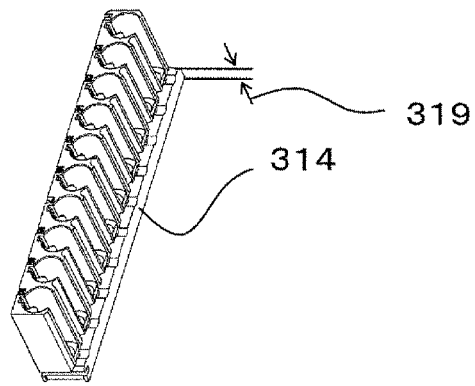
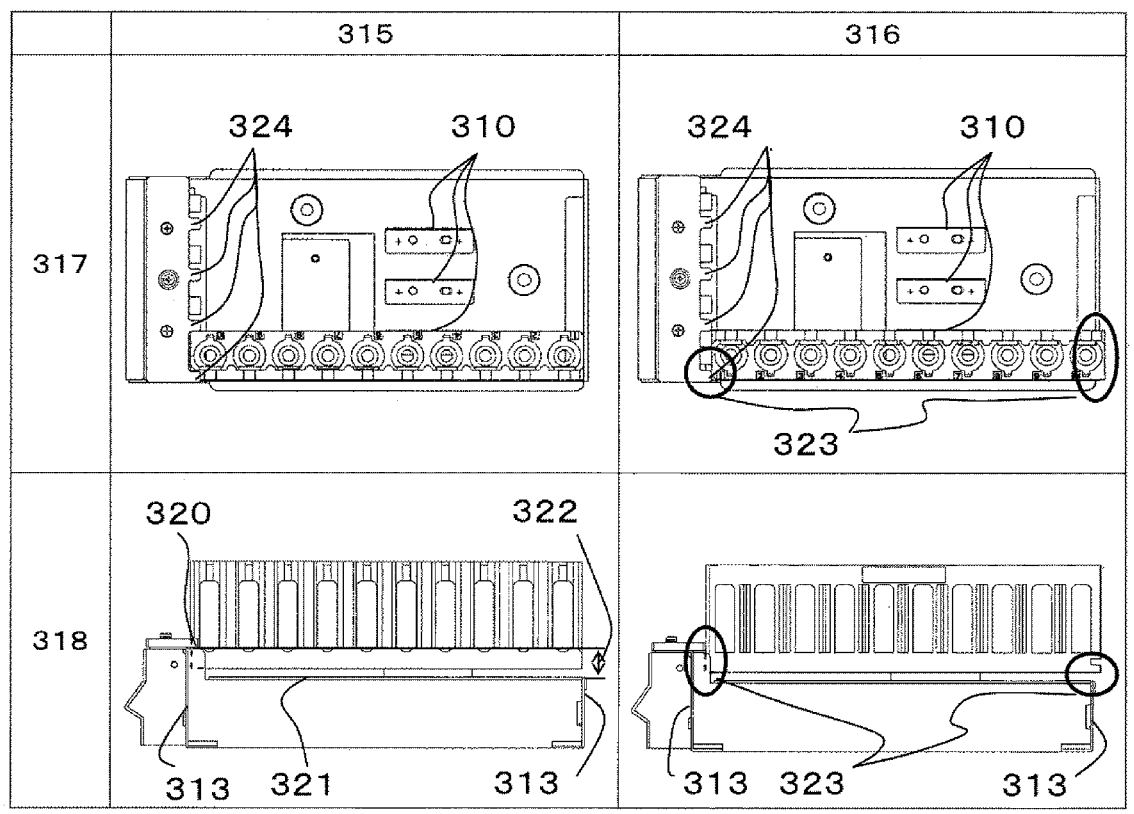

[FIG. 7]
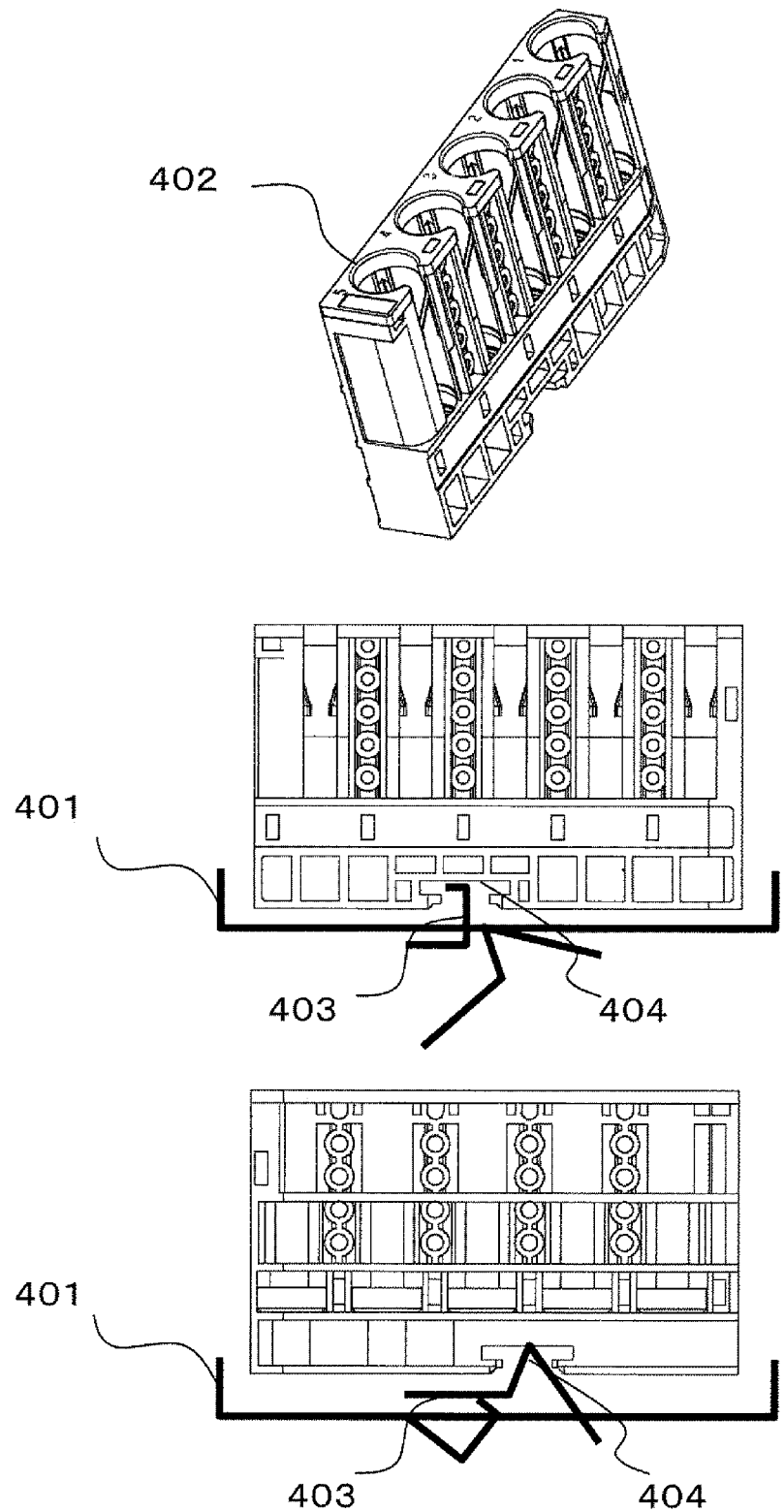

[FIG. 8]
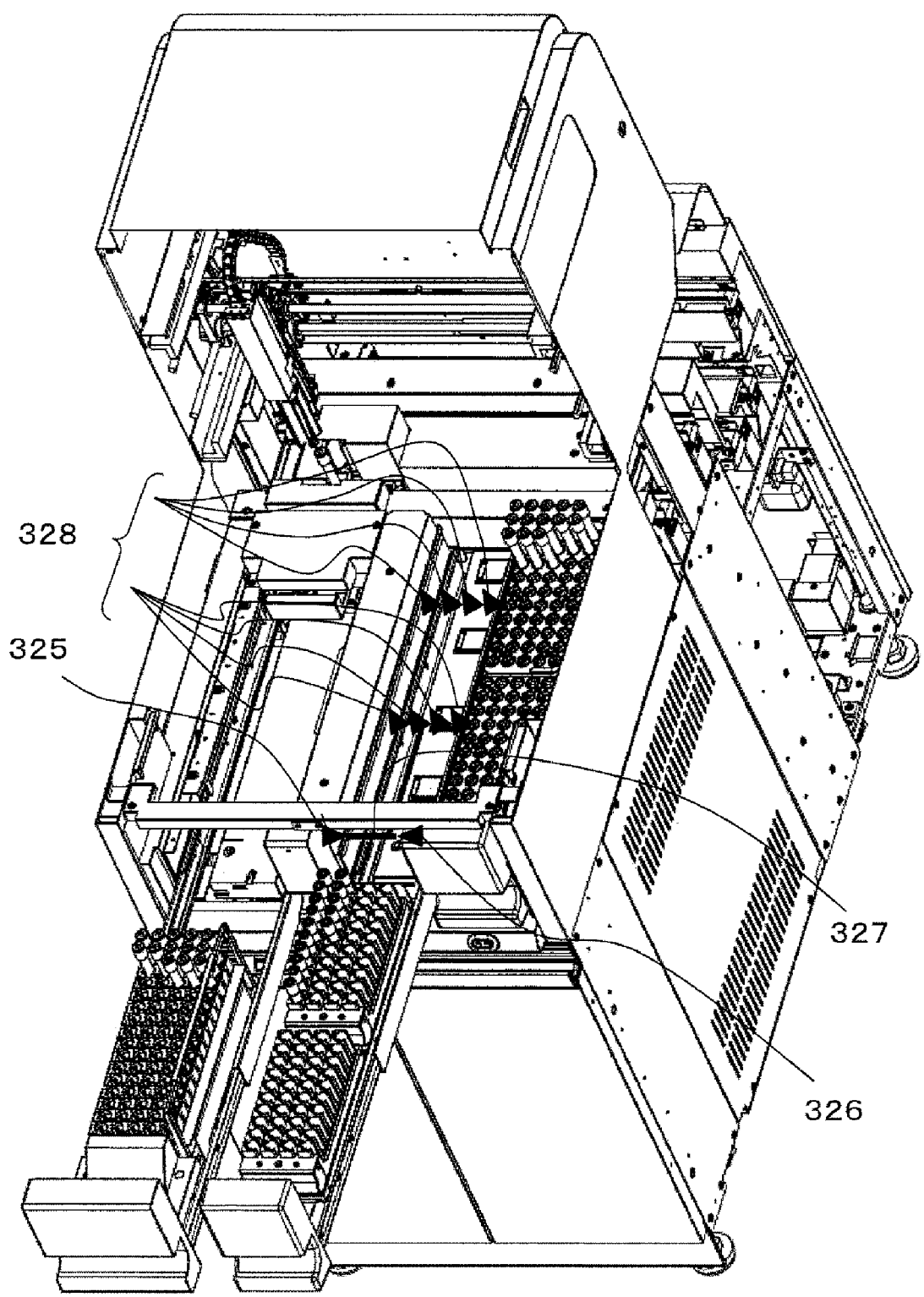

[FIG. 9]
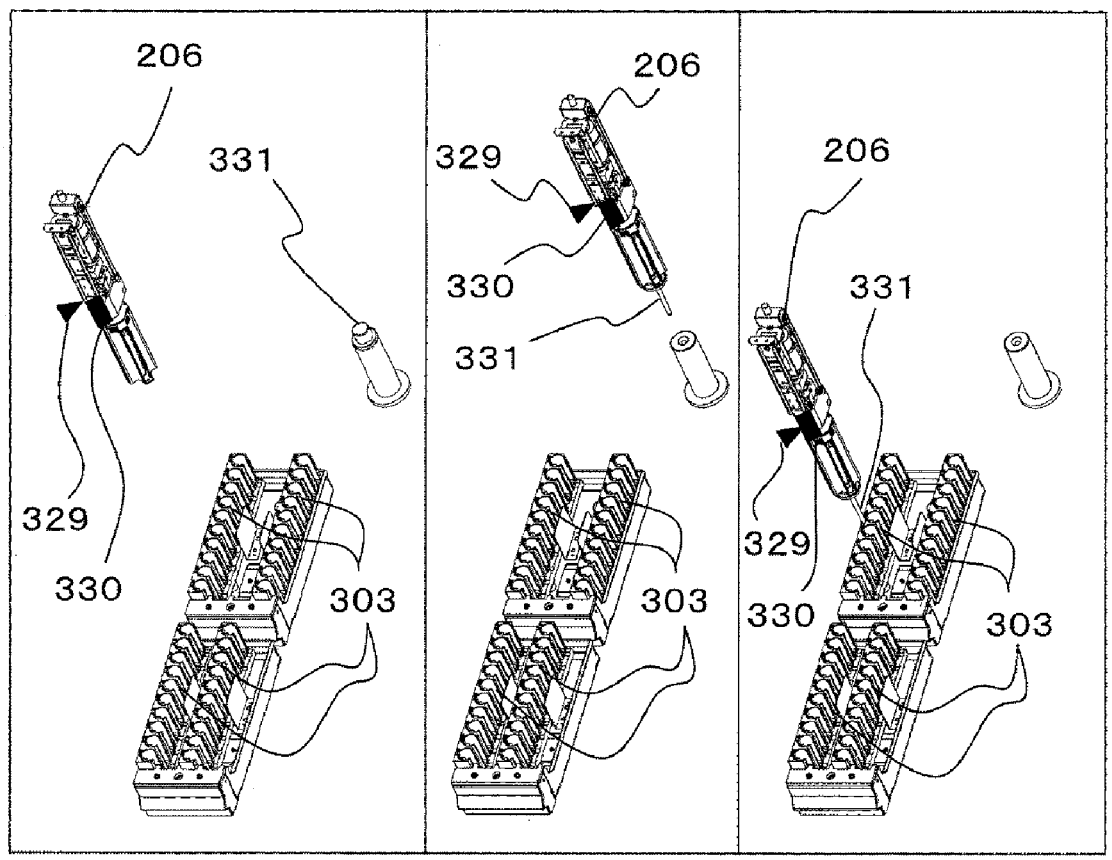

SAMPLE CONTAINER LOADING OR STORING UNIT AND SAMPLE TEST AUTOMATION SYSTEM PROVIDED WITH SAME

TECHNICAL FIELD

The present invention is about a unit for loading or storing sample containers, where a plurality of sample trays for placing sample containers can be installed, and the sample test automation system equipped with the foregoing unit.

BACKGROUND ART

The sample test automation system comprises a pre-processing portion where the sample such as blood and urine is placed in the sample containers and processed through the centrifugal separation or the dispensation to subdivide the sample before being measured with the automatic analyzer, and a post-processing portion where the sample is plugged and stored after the measurement with the automatic analyzer.

The Patent Document 1 discloses such a sample test automation system as being equipped with the units for loading and storing sample containers and using the sample trays for placing sample containers.

In the unit for loading sample containers (hereinafter referred to as the sample loading unit), the sample trays where sample containers are placed are installed, and the sample containers are removed from the sample trays with a robot arm or the like and automatically transported into the system. In the unit for storing sample containers (hereinafter referred to as the sample storing unit), the sample trays where sample containers are not placed are installed, and sample containers are placed on the sample trays with a robot arm or the like from inside of the system. Each sample tray has a unique identification information that is used for managing the ID of the sample tray, the ID of the placed sample container, the installation position information, and so on. While the sample trays dedicated to the system are prepared, the sample loading unit and the sample storing unit use the same trays.

In the sample test automation system, the sample containers are transported one by one by the sample container transport holder where one sample container is placed. On the other hand, the sample containers are transported by a rack where a plurality of sample containers are placed for many of automatic analyzers.

CITATION LIST

Patent Literature

PTL 1: International Publication No. 2011/148897

SUMMARY OF INVENTION

Technical Problem

The operations of the automatic analyzer that involve the use of the rack in the sample test automation system include (1) the online operation to transfer the sample containers from the sample container transport holder to the rack by the sample container transfer unit and then transport the rack to the automatic analyzer, (2) the online operation that uses a method called external samplings where the connection unit transports the sample container on the sample container transport holder in the connection unit to the sample suction position of the automatic analyzer, and (3) the offline operation that manually moves samples between the sample test automation system and the automatic analyzer. The cost is higher with online operations since the implementations of dedicated units are required. On the other hand, in the offline operation, the operator needs to manually transfer the sample containers from the sample trays to the rack, which makes the tasks of the operator be more cumbersome The inventors have considered the rack tray that can load and store sample containers between the rack and the sample container transport holder in the sample loading unit and the sample storing unit to enable the offline operation that does not require manual transport of sample containers to the rack. During the consideration, the inventors found issues such as sample droppings when there is no rack on the rack tray due to the incapability to determine the presence or orientation of the rack on the rack tray, the collisions between the sample and the rack when the rack was placed in the reverse direction, and so on.

Therefore, the present invention aims to provide the unit for loading/storing sample containers, which has the structure that prevents the rack tray from being installed on the apparatus unless the rack on the rack tray is full without adding a sensor or an actuator, and prevents the rack from being installed on the rack tray unless the rack assumes the right orientation, and a sample test automation system equipped with the foregoing unit.

Solution to Problem

For example, the configuration described in the claims is applied in order to solve the foregoing issues.

Although the claims include a plurality of means for solving the foregoing issues, to give an example, in the unit for loading/storing sample containers, which has sample rack trays and a sample rack tray installation portion where the sample rack trays are installed, the sample rack tray installation portion has a claw portion that moves in the direction where it touches a sidewall of the sample rack tray, the sample rack tray has a claw guard portion set on the sidewall portion of the sample rack tray, and the claw guard portion is configured to be pushed by a sample rack and separated from the sidewall of the sample rack tray.

Advantageous Effects of Invention

The present invention can provide a unit for loading or storing sample containers, which has the structure that prevents the rack tray from being installed on the apparatus unless the rack on the rack tray is full without adding a sensor or an actuator, and prevents the rack from being installed on the rack tray unless the rack assumes the right orientation, and a sample test automation system equipped with the foregoing unit. Issues, configurations, and effects other than those described above will be clarified by the descriptions of the following embodiments.

BRIEF DESCRIPTION OF THE DRAWINGS

FIG. 1 is a diagram illustrating an overall configuration of an sample test automation system.

FIG. 2 is an external view of a configuration of a sample storage unit.

FIG. 3 is a plan view of the configuration of the sample storage unit.

FIG. 4 is an external view of a sample rack-A tray and a sample rack-A tray installation portion.

FIG. 5 is a side view of the sample rack-A tray and the sample rack-A tray installation portion.

FIG. 6 is a view for explaining a reverse-positioning prevention structure of a sample rack-A.

FIG. 7 is a view for explaining a reverse-positioning prevention structure of a sample rack-B.

FIG. 8 is a schematic view (1) of another method of checking the presence or absence of a sample rack and a sample container.

FIG. 9 is a schematic view (2) of further another method of checking a sample rack and a sample container.

DESCRIPTION OF EMBODIMENTS

Hereinafter, the embodiments of the present invention will be described with reference to the drawings.

FIG. 1 is a diagram showing the overall configuration of the sample test automation system. The sample test automation system shown in FIG. 1 is configured such that the pre-processing system 100 and the automatic analyzers 101 & 102 are connected by the transport line 103 and the sample container transfer units 104 & 105 and controlled by a controller 106. This configuration is merely an example, and many other combinations are possible in actual configurations. For example, although not included in the configuration shown in FIG. 1, a post-processing unit that performs the plugging process, temporary storing for retesting, and retention may be connected in some cases.

The sample test automation system is equipped with a pre-processing system 100 that performs various preprocesses on the samples accommodated in the sample containers, and a plurality (two in this embodiment) of automatic analyzers 101 & 102, which performs an analysis process on the pre-processed samples in sample containers, a transport line 103 for transporting the sample container holder, where the sample container 207 is mounted, between the pre-processing system 100 and the plurality of automatic analyzers 101 & 102, a sample container holder provided between the transport line 103 and each of the plurality of automatic analyzers 101 & 102 and transported by the transport line 103, a plurality (two in this embodiment) of sample container transfer mechanisms 104 & 105 for transferring sample containers to and from the sample container rack used for mounting and transporting sample containers in each of the plurality of automatic analyzers 101 & 102, and the controller 106 that controls the operation of the entire sample test automation system Also, the controller 106 controls the operations of the pre-processing system 100, the transport line 103, and the sample container transfer units 104 & 105, and performs overall management of the information in the sample test automation system.

The pre-processing system 100 is configured by connecting a plurality of units having various functions. These units include a sample loading unit 202 for loading sample containers containing samples, a centrifugal separation unit for performing centrifugal separation processing on samples, an unplugging unit for unplugging sample containers, an identification information attaching unit that attaches identification information such as a barcode to child sample containers, a dispensing unit that dispenses the samples subdivided from sample containers to the child sample containers, a plugging unit that plugs sample containers, and a sample storing unit 201 for storing the processed sample containers.

The sample containers are transported from the sample loading unit 202 into the system, the barcodes attached to the sample containers are read, and the read information is queried to the controller 106. The subsequent processing is performed based on the instructions from the controller 106.

The sample storing unit 201 stores the sample containers processed in the system, which is then used in the next process in accordance with the operation. It is generally used for storing, for automatic analyzers 107 & 108 not connected to the sample test automation system, for outsourced tests, and for manual analyses. In some cases, it is used as a temporary storage for sample containers. Upon retesting of the automatic analyzers 101 & 102 connected to the system, the stored sample containers are transported back into the system according to the instructions from the controller 106. Then it is transported to the automatic analyzer 101 or 102 via the dispensing unit or other routes as necessary.

In the foregoing unit of the pre-processing system 100, the transport line 103, and the sample container transfer units 104 & 105, there is a holder transport line for transporting the sample container holders where sample containers are placed one by one, and these sample containers are transported into the system.

According to the application, various automatic analyzers used for clinical purposes, such as a biochemical automatic analyzer, an immune automatic analyzer, and a coagulation automatic analyzer are connected to the automatic analyzers 101 & 102. In the automatic analyzers 101 & 102, the sample containers are transported mainly by the dedicated sample container racks such as the sample rack-A 303 and the sample rack-B 402, where a plurality of sample containers are placed. Similarly, the sample containers are transported by the sample rack dedicated to each apparatus, such as the sample rack-A 303 in the automatic analyzer 107 not connected to the sample test automation system, and the sample rack-B 402 in the automatic analyzer 108 not connected to the sample test automation system.

In the sample storing unit 201, the sample containers are transferred from the sample container holders one by one to the sample trays 212, where a plurality of sample containers are placed, and stored therein. When the sample containers are transferred and stored in the sample tray 212, the sample containers may be loaded into the automatic analyzers 107 & 108 not connected to the sample test automation system via manual transferring of the sample containers into the dedicated sample container rack. On the other hand, when the sample containers are transferred to and stored in the sample rack-A 303, the sample containers may be loaded into the automatic analyzer 107 not connected to the sample test automation system by removing the sample rack-A 303, on which the sample containers are placed, from the sample storing unit 201 and then transferring the sample rack-A 303 from the sample rack-A tray 301 to the automatic analyzer 107 not connected to the sample test automation system. When the sample containers are transferred to and stored in the sample rack-B 402, the sample containers may be loaded into the automatic analyzer 108 not connected to the sample test automation system by directly transferring the sample rack-B tray 401, on which the sample containers are placed, to the automatic analyzer 108 not connected to the sample test automation system.

With reference to FIG. 2 and FIG. 3, the sample storing unit 201 that is a constituent unit of the sample test automation system will be described.

FIG. 2 is a 3D external view of the sample storing unit 201, and FIG. 3 is a plan view of the sample storing unit 201 in FIG. 2.

Since the sample storing unit 201 and the sample loading unit 202 often have similar configurations, the sample storing unit 201 is used for the description as an example in the present embodiment, but it should be noted that the same configurations can be applied to the sample loading unit 202.

The sample storing unit 201 comprises a sample tray installation slide mechanism 203 on which the sample trays 212 (where a plurality of sample containers 207 can be set) is placed, an identification information reader portion 208 for reading identification information of the sample tray 212, a sample transport conveyor 209 for transporting the sample containers in the sample test automation system, a barcode reading portion 211 for reading the identification information attached to the sample container 207, and a sample container transfer mechanism 206 for transporting the sample container 207 from the sample transport conveyor 203 to the sample tray 212.

The sample tray installation slide mechanism 203 is of a drawer type in consideration of the usability when the sample tray is placed therein. In the present embodiment, three portions; (1) the sample trays installation slide mechanism 212, (2) the sample rack-A tray installation slide mechanism 204 and (3) the sample rack-B tray installation slide mechanism 205 related to the present invention, are described as the sample tray installation portions, however it can be configured with one or more of such portions. Moreover, it doesn't have to be a drawer type.

The operator who handles the system installs the sample tray 212 on the sample tray installation slide mechanism 203 that has been pulled out. By pushing back the drawer of the sample tray installation slide mechanism 20 after the installation, the identification information tag not shown in the figure, which is to be placed on the sample tray 212, overlaps with the identification information reader portion 208 to enable the reading of the identification information.

The unique identification number of each sample tray 212 is registered in advance, the read identification information is stored in the controller 106, and various applications of the sample tray 212 are identified. This information is updated by opening and closing the drawer, replacing the sample tray 212, and so on. The update timings can be set at the controller 106. Also, the identification number is specified on the body of the sample tray 212.

The sample rack-A tray 301 in relation to the present invention is handled in the same manner as the sample tray 212.

The controller 106 distinguishes the sample tray 212 and the sample rack A301 using a predetermined ranges of identification information, such as ID0001 to ID2000 for the sample tray 212, and ID2001 to ID4000 for the sample rack-A tray 301.

Normally, the sample container 207 loaded from the sample loading unit 202 is subjected to various processes in the sample test automation system and arrives the sample transfer position 210 through the sample transport conveyor 209 in the system. At the sample transfer position 210, the identification information attached to the sample container 207 is read by the barcode reader 204. After the reading, the controller 106 is queried about the information, and it is transferred by the sample transfer mechanism 206 instructed by the controller 106 to the sample tray. For example, if instructed to use it for storing, the sample container 207 is transferred to the position where the sample tray 212 registered in advance is deployed. If instructed to use it for the automatic analyzer 107 that uses the sample rack-A not connected to the sample test automation system, the sample container 207 is transferred to a position where the sample rack-A tray 301 registered in advance is deployed. If instructed to use it or the automatic analyzer 108 that uses the sample rack-B not connected to the sample test automation system, the sample container 207 is transferred to a position where the sample rack-B tray 401 registered in advance is deployed.

The controller 106 stores the unique number and the position of the sample tray 212, to which the sample container 207 has been transferred, and such information can be searched at the controller 106. Also, when a retesting is required on the automatic analyzer 101 or 102, the applicable sample container 207 can be taken into the sample test automation system again according to the instruction from the controller 106. The sample container 207 is collected at the sample container transfer mechanism 206 from the position of the sample tray 212 stored at the controller 106, where the sample container 207 required for the retesting is placed. The collected sample container 207 is transferred to the sample transfer position 208 on the sample transport conveyor 203 for transporting the samples in the system. After the identification information of the sample container 207 is read at the barcode reading portion 211, and the controller 106 is queried, the sample container 207 is transported back into the system.

The configuration of the sample rack-A tray in relation to the present invention will be described with reference to FIG. 4 and FIG. 5.

FIG. 4 is a 3D external view showing the sample rack-A tray and the sample rack-A tray installation portion, and FIG. 5 is a side view showing the sample rack-A tray and the sample rack-A tray installation portion.

The sample rack-A tray installation portion 302 installed on the apparatus side comprises (1) a sample rack-A tray receiving protrusion portion 304 which is retracted by the weight of the sample rack-A tray 301, (2) a claw portion 305 that operates in the direction in contact with the sample rack-A tray sidewall portion 313 in conjunction with the sample rack-A tray receiving protrusion portion 304, (3) a positioning pin 306 for positioning sample rack-A tray and preventing reverse installation, and (4) an identification information reader portion 208 for reading identification information of sample rack-A tray 301.

The sample rack-A tray 301 on which a plurality of sample racks A 303 can be placed comprises (1) a sample rack-A receiving protrusion portion 307 which is retracted by the weight of sample rack-A 303, and (2) a claw guard portion 308 that operates in conjunction with the sample rack-A receiving protrusion portion 307 to avoid the motion trajectory of the claw portion 305 of the sample rack-A tray installation portion 302, (3) a positioning boss 311 for positioning the sample rack-A tray 301 and preventing reverse installations, (4) an identification information tag 312 with an identification information unique to the sample rack-A tray 301, (5) a sample rack-A holding guide portion 309 and a sample rack-A partition plate 310 deployed at the positions where sample rack-A does not enter in the opposite direction. In this embodiment, the sample rack-A tray 301 has the opening portion 332, and the claw guard portion 308 is provided to cover at least a part of the opening portion.

In the present embodiment, the sample rack-A tray 301 is described as having the configuration where four sample racks A301 are placed. However, it can be configured with one or any number of the sample racks A301, which means, the number of the racks can be added.

The sample rack-A 303 is installed with up and down motions on the sample rack-A tray 301.

The mechanism composed of the sample rack-A receiving protrusion portion 307 and the claw guard portion 308 of the sample rack-A tray 301 has the structure that rotates the sample rack-A receiving protrusion portion 307 with the weight of the sample rack-A 303 when the sample rack-A 303 is installed, for the sample rack-A receiving protrusion portion 307 to be retracted so as to get into the sample rack-A tray sidewall 313. The claw guard portion 308 is made from the same components as those used for the sample rack-A receiving protrusion portion 307, assuming the shape that moves toward the opening direction against the sample rack-A tray sidewall portion 313 by the rotational motion of the sample rack-A receiving protrusion portion 307. In other words, the claw guard portion 308 is configured to be pushed by the sample rack-A 303 and separated from the opening portion 332. Also, the claw guard portions 308 are provided at the positions where the sample rack-A 303 is mounted on the sample rack-A tray 301. For example, if there are four positions for mounting the sample rack-A 303, four claw guard portions 308 (and the sample rack-A receiving protrusion portions 307 connected to the claw guard portions 308) should be provided. The number of the opening portions 332 may be the same as the number of the claw guard portions 308, or the opening portions 332 may be provided in such a form that the opening portions 332 communicate with each other so that the number of the opening portions 332 is smaller than the number of the claw guard portions 308. When the sample rack-A 303 is removed, the mechanism composed of the sample rack-A receiving protrusion portion 307 and the claw guard portion 308 returns to the original position by the spring force. This spring generates a force for pressing the sample rack-A 303 against the opposite sidewall of the sample rack-A tray 301 when the sample rack-A 303 is installed. As a result, the sample rack-A 303 is positioned on the sample rack-A tray 301. The mechanism is provided for each sample rack-A 303. The structure of the sample rack-A tray 301 provided for preventing reverse installations of the sample rack-A 303 is described later in this document.

On the other hand, the mechanism composed of the sample rack-A tray receiving protrusion portion 304 and the claw portion 305 of the sample rack-A tray installation portion 302 has the structure that rotates the sample rack-A tray receiving protrusion portion 304 with the weight of the sample rack-A tray 301 when the sample rack-A tray 301 is installed, for the sample rack-A tray receiving protrusion portion 304 to be retracted so as to get into the bottom surface of the sample rack-A tray installation portion 302. The claw portion 305 is made from the same components as those used for the sample rack-A tray receiving protrusion portion 304, and assuming the shape that moves toward the closing direction against the sample rack-A tray sidewall portion 313 by the rotational motion of the sample rack-A tray receiving protrusion portion 304. When the sample rack-A tray 301 is removed, the mechanism composed of the sample rack-A tray receiving protrusion portion 304 and the claw portion 305 returns to the original position by the spring force. The claw portion 305 has a width dimension covering the mechanism composed of a plurality of sample rack-A receiving protrusion portions 307 and the claw guard portion 308 provided on the sample rack-A tray 301. Also, if the sample rack to be installed has a cleft-like notch on the side surface, the linear dimension of the claw portion 305 may be set to enter the notch to create a structure for preventing the sample rack from floating.

The positioning of the sample rack-A tray 301 is performed by fitting the positioning pin 306 provided on the sample rack-A tray installation portion 302 with a positioning boss 311 provided on the sample rack-A tray 301. The positioning pin 306 and the positioning boss 311 may assume any shape that fits each other. For example, the positioning pin 306 may be formed in a convex shape, the positioning boss 311 may be formed in a concave shape, and vice versa.

The combination of the mechanism of the sample rack-A tray 301 and the mechanism of the sample rack-A tray installation portion 302 creates the structure that does not allow the sample rack-A tray 301 to be installed on the sample rack-A tray installation portion 302 unless the sample racks A 303 are installed on all the positions of the sample rack-A trays 301.

That is, when the sample rack-A 303 is placed on the sample rack-A tray 301, the claw guard portion 308 is pushed by the sample rack-A 303 and is separated from the opening portion 332 of the sample rack-A tray 301. Since the claw guard portions 308 are provided at all positions, which can receive the sample rack-A 303, of the sample rack-A trays 301, all the claw guard portions 308 will be separated from the opening portions 332 by installing all the sample racks A 303 in these positions. When the sample rack A301, in a state where a sample rack-A 303 is placed and all the claw guard portions 308 are separated from the opening portion 332, is placed on the sample rack-A tray installation portion 302, the tip of the claw portion 305 passes through the opening portion 332 without being obstructed by the claw guard portion 308, and the tip of the sample rack-A tray receiving protrusion portion 304 is lowered to the bottom surface of the sample rack-A tray installation portion 302. This state enables the complete installation of the sample rack-A tray 301 on the sample rack-A tray installation portion 302.

When the sample rack-A 303 is not correctly installed on the sample rack-A tray 301 due to the wrong orientation of the sample rack-A 303 or the sample rack-A 303 not being inserted deep into the sample rack-A tray 301, the claw guard 308 will not be completely separated from the opening portion 332, and the claw guard portion 308 will remain on the motion trajectory of the tip of the claw portion 305 to hinder the operation of the claw portion 305. Similarly, when the sample rack-A 303 is not installed at all positions of the sample rack-A tray 301, the claw guard portion 308 which does not separate from the opening portion 332 will remain to hinder the operation of the claw portion 305. In these cases, since the operation of the claw portion 305 is hindered by the claw guard portion 308, the tip of the sample rack-A tray receiving protrusion portion 304 does not lower to the bottom surface of the sample rack-A tray installation portion 302. This state can prevent the sample rack-A tray 301 from being installed in the sample rack-A tray installation portion 302.

It should be noted that the opening portion 332 may not be provided for the sample rack-A tray 301. In this case, the claw part 305 may be configured to be short, and the claw guard portion 308 may be configured to bulge toward the claw portion 305 so that the claw guard portion 308 is separated from the sample rack-A tray sidewall portion 313.

As described above, the sample rack-A tray 301 has identification information unique to the identification information tag. By reading this information with the identification information reader portion 208 provided in the sample rack-A tray installation portion 302, the controller 106 determines the use of the sample rack-A tray 301 and the state of the sample container transfer, which enables not only the selection of the storage destination based on the sample type of the sample container 207, but also the settings such that the transfer of the sample containers is restarted from the 9 positions of the third sample rack-A 303 on the sample rack-A tray 301 when it is reinstalled, even if the sample rack-A tray 301 is removed during the sample container transfer, as in the case where the sample containers are transferred to the 8 positions of the third sample rack-A 303 on the sample rack-A tray 301.

The foregoing structures of the sample rack-A tray 301 and the sample rack-A tray installation portion 302 are applicable to all the type of the sample rack.

FIG. 6 is an explanatory diagram of the reverse installation prevention structure of the sample rack A.

According to the plan view 317, the gaps between the sample rack-A holding guide protrusion portions 324 has a width dimension that can accommodate only the upper width of the sample rack A. The gaps between the partition plates 310 has a width dimension that can accommodate the lower width including the protrusion portion 314 of the sample rack-A 303. Also, one end of the sample rack-A holding guide protrusion portion 324 is in a positional relation that coincides with the partition plate 310.

Also, according to the side view 318, the relation is such that the gap between the sample rack-A holding guide bottom surface and the sample rack-A tray sidewall upper surface (t2 322)> the thickness of the sample rack-A protrusion portion (t1 319).

With the above configuration, the installation attempts of the sample rack-A 303 in the reverse direction can be deterred through the interference with either of the sample rack-A protrusion portion 314, the partition plate 310, or the sample rack-A tray sidewall portion 313.

The reverse installation prevention structure can be expanded for any type, if the sample rack is neither bilaterally nor longitudinally symmetrical like the reverse installation prevention structure of the sample rack-B shown in FIG. 7, FIG. 8 and FIG. 9 show the method for confirming the presence or absence of the sample racks and the sample containers not using the present invention.

FIG. 8 shows a method of detecting the presence or absence of the sample racks and the sample containers by using an optical sensor or the like.

This method is configured by having the sample container presence/absence detecting sensor light-emitting portion 325 and the sample container presence/absence detecting sensor light-receiving portion 326 set at a height for detecting only the sample containers when they are installed on the sample rack, and the sample rack presence/absence detecting sensor 328 that detects the sample rack when the sample rack tray installation slide mechanism 204 is set in the apparatus Regarding the sample container presence/absence detection, the presence/absence of sample containers is detected by blocking the sensor optical axis when the sample rack tray installation slide mechanism 204 is set in the apparatus.

Although an optical sensor is taken as an example, there is no limitation on the sensor type.

In this method, the same number of sensors as the number of the sample racks is required. Thus, the cost is higher. Moreover, when even one sample container is set on the sample rack, it does not operate and cannot resume the transferring from the position where it stopped.

FIG. 9 shows a method using the cushion mechanism of the sample container transfer mechanism 206.

When the cushion mechanism comes into contact with any obstacle when the sample container transfer mechanism 206 is lowered, the tip of the sample container transfer mechanism 206 cushions, and the cushion detecting plate 330 moves up in conjunction with this cushioning motion. This is a mechanism for detecting such cushioning motions with the cushion detecting sensor 329, which operates mainly when any abnormality occurs.

In this method, the cushion mechanism is actively used to detect the presence/absence of the sample rack.

The sample container transfer mechanism 206 moves onto the cushion detection dummy shaft 331 and grasps the cushion detection dummy shaft 331, moves up again and moves onto the sample rack, and then moves down the distance until the cushion detection dummy shaft 331 touches the sample rack and moves a bit further down (+a). The presence/absence of the sample rack can be detected by the presence/absence of the cushioning motion at this time. The arrangement of the sample racks can be detected by repeating this motion by the number of sample racks.

This method can be extended to the detection of the presence/absence of the sample containers on the sample rack. However, if the sample container is not closed, it may cause contamination.

This method enables the detection of the presence/absence of the sample containers and the presence/absence of the sample rack without adding any sensor or mechanism. However, the sample container transfer mechanism 206 must operate by the number of the sample racks and the number of the sample container installation positions, which is time-consuming.

On the other hand, the present invention can deliver the inexpensive sample loading unit and sample storing unit that enable the offline operations without requiring the manual transfer of sample containers to the rack.

It should be noted that the present invention is not limited to the foregoing embodiments. It has more variations. The foregoing embodiments are selected for detailed descriptions to facilitate the understanding of the present invention. Thus, this invention should not be limited to the ones with the configurations explained herein.

DESCRIPTION OF REFERENCE NUMERALS AND SIGNS

100: pre-processing system
101, 102: automatic analyzer
103: transport line
104, 105: sample container transfer unit
106: controller
107: automatic analyzer using sample rack-A not connected to sample test automation system
108: automatic analyzer using sample rack-B not connected to sample test automation system
201: sample storing unit
202: sample loading unit
203: sample tray installation slide mechanism
204: sample rack-A tray installation slide mechanism
205: sample rack-B tray installation slide mechanism
206: sample container transfer mechanism
207: sample container
208: identification information reader portion
209: sample transport conveyor
210: sample transfer position
211: barcode reading portion
212: sample tray
301: sample rack-A tray
302: sample rack-A tray installation portion
303: sample rack-A 304: sample rack-A tray receiving protrusion portion
305: claw portion
306: positioning pin
307: sample rack-A receiving protrusion portion
308: claw guard portion
309: sample rack-A holding guide
310: sample rack-A partition plate
311: positioning boss
312: identification information tag
313: sample rack-A tray sidewall portion
314: sample rack-A protrusion portion
315: sample rack-A normal position
316: sample rack-A reverse position
317: plan view
318: side view
319: sample rack-A protrusion portion thickness t1
320: bottom of sample rack-A holding guide
321: top of sample rack-A tray sidewall portion
322: gap t2 between bottom of sample rack-A holding guide and top of sample rack-A tray sidewall portion
323: interference position
324: sample rack-A holding guide protrusion portion
325: light-emitting portion of sample container presence/absence detecting sensor
326: light-receiving portion of sample container presence/absence detecting sensor
327: optical axis of sample container presence/absence detecting sensor
328: sample rack-A presence/absence detecting sensor
329: sample container transfer mechanism cushion detecting sensor
330: sample container transfer mechanism cushion detecting plate
331: dummy shaft for cushion detection
332: opening portion
401: sample rack-B tray
402: sample rack-B
403: sample rack-B tray protrusion portion
404: sample rack-B groove

The invention claimed is:

1. A sample container loading or storing unit comprising:
a sample rack tray; and
a sample rack tray installation portion on which the sample rack tray is installed, wherein
the sample rack tray installation portion includes a claw portion that moves in a contact direction with a sidewall portion of the sample rack tray,
the sample rack tray includes a claw guard portion provided on the sidewall portion of the sample rack tray,
if a sample rack is not installed or not correctly installed, the claw guard portion is configured to remain on a motion trajectory of the claw portion to hinder the operation of the claw portion,
if a sample rack is correctly installed, the claw guard portion is configured to be separated from the sidewall portion of the sample rack tray, thereby not obstructing the claw portion operation,
the claw portion is configured, in operation, to engage the sample rack to prevent it from floating,
the sidewall portion of the sample rack tray includes an opening,
the claw guard portion covers at least a part of the opening, and
the claw portion enters a sample rack side on the sidewall portion of the sample rack tray through the opening.

2. The sample container loading or storing unit according to claim 1, wherein
the sample rack tray includes a sample rack receiving protrusion portion configured to be pushed by the sample rack,
the claw guard portion is configured to move so as to avoid a movement track of the claw portion in conjunction with the sample rack receiving protrusion portion,
the sample rack tray installation portion includes a sample rack tray receiving protrusion portion configured to be pushed by the sample rack tray, and
the claw portion is configured to move in the contact direction with the sidewall portion of the sample rack tray in conjunction with the sample rack tray receiving protrusion portion.

3. The sample container loading or storing unit according to claim 2, wherein
the sample rack tray includes a recess for positioning and reverse orientation prevention of the sample rack tray, and
the sample rack tray installation portion includes a projection to be engaged with the recess.

4. The sample container loading or storing unit according to claim 3, wherein
the sample rack tray includes an identification information tag having unique identification information of the sample rack tray, and
the sample rack tray installation portion includes an identification information reader portion that reads the identification information of the sample rack tray.

5. The sample container loading or storing unit according to claim 4, wherein
the sample rack tray includes a sample rack partition plate.

6. An sample test automation system comprising:
the sample container loading or storing unit according to claim 1.

* * * * *